United States Patent [19]

Masumoto et al.

[11] 3,932,204

[45] Jan. 13, 1976

[54] COBALT-ALUMINUM MAGNETIC MATERIALS WITH HIGH COERCIVE FORCE

[75] Inventors: Hakaru Masumoto; Kiyoshi Watanabe, both of Sendai, Japan

[73] Assignee: The Foundation: The Research Institute of Electric and Magnetic Alloys, Sendai, Japan

[22] Filed: Sept. 7, 1971

[21] Appl. No.: 178,208

Related U.S. Application Data

[60] Division of Ser. No. 873,752, Oct. 31, 1969, abandoned, which is a continuation-in-part of Ser. No. 759,823, Sept. 10, 1968, abandoned, which is a continuation of Ser. No. 398,008, Sept. 21, 1964, abandoned.

[52] U.S. Cl. ............... 148/103; 75/170; 148/31.57; 148/108; 148/121

[51] Int. Cl. ............................................. H01f 1/02

[58] Field of Search....... 148/103, 31.57, 10 B, 121, 148/31.55; 75/170, 171

[56] References Cited

UNITED STATES PATENTS

| | | | |
|---|---|---|---|
| 1,792,483 | 2/1931 | Elmen | 148/31.55 |
| 1,910,309 | 5/1933 | Smith et al. | 148/31.55 |
| 1,927,940 | 9/1933 | Koster | 75/170 |
| 2,829,048 | 4/1958 | Cochardt et al. | 75/170 |
| 3,203,838 | 8/1965 | Masumoto et al. | 148/101 |
| 3,211,592 | 10/1965 | Masumoto et al. | 148/121 |
| 3,368,883 | 2/1968 | Barnett et al. | 75/170 |
| 3,415,643 | 12/1968 | Freche et al. | 75/170 |
| 3,429,697 | 2/1969 | Cline | 75/170 |
| 3,445,624 | 5/1969 | Sunnen | 75/170 |
| 3,617,260 | 11/1971 | Detert | 75/170 |

FOREIGN PATENTS OR APPLICATIONS

| | | | |
|---|---|---|---|
| 425,455 | 3/1935 | United Kingdom | 148/101 |

OTHER PUBLICATIONS

Köster, et al., Das System Kobalt-Mangan-Aluminiumi, in Zeitifüer Metallisunde, 30, Sept. 1938, pp. 281-287.

Bozorth, R., Ferromagnetism, New York, 1951, pp. 283-284.

*Primary Examiner*—Walter R. Satterfield
*Attorney, Agent, or Firm*—Young & Thompson

[57] ABSTRACT

Magnetic materials having large coercive force consist essentially of 66 to 95% by weight of Co, 5 to 25% by weight of Al, and a small but effective amount of at least one of Ti, Mo, Cr, V and W, the amount of the third metal being effective to increase the coercive force substantially above the coercive force of the same Co-Al alloy without that third metal.

1 Claim, 24 Drawing Figures

Residual flux density (G)

Coercive force (Oe)

Residual flux density (G)

Coercive force (Oe)

Residual flux density (G)

Coercive force (%)

Residual flux density (G)

Coercive force (Oe)

Residual flux density (G)

Coercive force (Oe)

COBALT-ALUMINUM MAGNETIC MATERIALS WITH HIGH COERCIVE FORCE

Figure 1A:
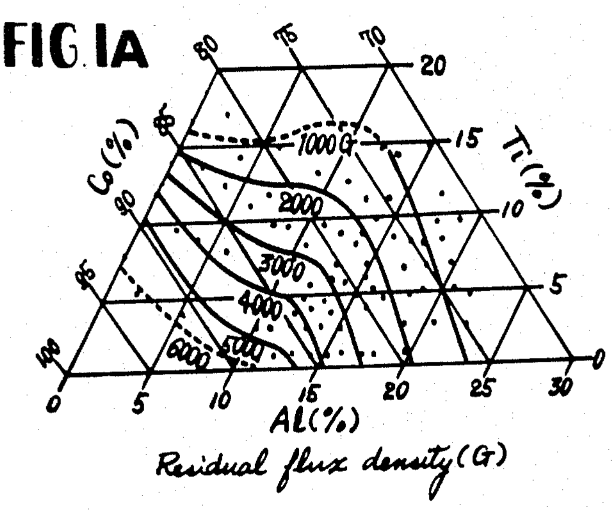

The present application is a division of copending application Ser. No. 873,752 filed Oct. 31, 1969 and now abandoned, which in turn was a continuation-in-part of copending application Ser. No. 759,823 filed Sept. 10, 1968, and now abandoned, which in turn was a continuation of Ser. No. 398,008 filed Sept. 21, 1964, and now abandoned.

This invention relates to magnetic materials having a large coercive force, more particularly to the production of permanent magnets consisting of a Co and Al base alloy with a definite amount of one or more of Ti, Mo, Cr, V and W.

The principal object of the invention is to provide materials for permanent magnets having a large coercive force based on Co-Al alloys.

As single magnetic domain fine particles magnets have heretofore been known iron powder magnets, Fe-Co powder magnets, Bismanol (Mn-Bi alloys), Ferroxdure ($BaO.6Fe_2O_3$) etc. having very large coercive force. In manufacturing such magnets it is necessary first to provide magnetic powders of very fine, but suitable size, then to compress the powders under a suitable pressure to a suitable shape and some of them should be sintered at elevated temperature and moreover, for the former two magnets, it is very difficult to manufacture fine powder of suitable size and its method of manufacturing is very complicated. In other words, the above magnets are usually very complicated in the manufacture and have the disadvantage that it is difficult to obtain always a product having the same properties.

In order to obviate the above disadvantages, the inventors have tried to easily obtain magnets having large coercive force by selecting an alloy which precipitates a single magnetic domain fine particle phase in the non-magnetic matrix by a simple heat treatment according to the equilibrium diagram and found that a Co-Al alloy containing 10 to 25% of Al can attain the object and shows a large coercive force of 1,320 oersteds by subjecting it to a suitable heat treatment.

After further investigations of plural alloys based on the Co-Al alloys with one or more of Ti, Mo, Cr, V, W, Fe, Mn, Cu, Si, Sn, Sb and Zn the inventors have discovered fine powder magnets having large coercive force.

In carrying out the invention preferably amounts of the addition elements are as follows:

As the weight ratio, to the binary alloy containing 42 to 95% Co, and 0 to 25% Al is added 1 to 57% of one or more of 0 to 20% Ti, 0 to 20% Mo, 0 to 13% Cr, 0 to 19% V, and 0 to 26% W, and the alloy may contain a small amount of impurities. The above alloy is melted and poured in a suitable medium or metal mold and comparatively quickly cooled, then heated to a temperature above 200°C. and lower than the solid solubility line for several minutes to several hundred hours, thereby precipitating single magnetic domain fine particles of less than 0.1 micron of $\zeta$ phase in the non-magnetic matrix of the $\epsilon$ phase.

According to the invention the cast or forged article is heated to a temperature above the solid solubility line for one minute to several hours to subject it to a homogenizing solid solution treatment and then quenched in air, water, or oil, further heated to a temperature above 200°C. and lower than the solid solubility line for a few minutes to several hundred hours, whereby single mangetic domain fine particles of less than 0.1 micron of the $\zeta$ phase can be precipitated in the non-magnetic matrix of $\epsilon$ phase.

The invention will be carried out by regulating the cooling rate suitably to a slow rate in case of casting said alloy in a metal mold or sand mold, or in case of throwing the alloy into a suitable cooling medium after being subjected to said solid solution treatment, whereby the single magnetic domain ferro-magnetic fine particles of less than 0.1 micron of $\zeta$ phase can be precipitated in the non-magnetic matrix of $\epsilon$ phase.

The principle of the invention will be further explained in detail by an example as follows:

At first, for manufacturing the alloys of the invention, Co was melted with a suitable melting furnace in air, in inert gas, in vacuo and the like non-oxidizing atmosphere and a small amount of Mn, Si, Al, Ti and other degassing agent was added to eliminate gases, then a definite amount of Ti, Mo, Cr, V or W was added and thoroughly stirred to obtain a homogeneous molten alloy. As Sb, Mn, Zn etc. and the like element is liable to volatilize, it is preferred to add them last. The molten alloy thus obtained was poured into a mold of the desired shape and size to produce a sound ingot or cast product. The forgeable alloy may be forged at a suitable temperature to manufacture articles of a desired shape.

Next, the cast product or forged article as above mentioned was quenched from a suitable temperature above the solid solubility line into water, oil, air or other suitable medium and the greater part was thus made solid solution of $\epsilon$ phase. The optimum cooling rate should be suitably selected according to the composition of the alloy. Then it was heated to a temperature above 200°C. and lower than the solid solubility line for a few minutes to several hundred hours to precipitate ferro-magnetic fine particles of less than 0.1 micron of $\zeta$ phase.

The invention may also be carried out in the following manner, that is, the molten alloy is cast in a desired mold at a comparatively high cooling speed, so that the structure of the cast product has become almost a solid solution of $\epsilon$ phase and if it is heated to a temperature above 200° C. and lower than the solid solubility line for several minutes to several hundred hours, single magnetic domain fine particles of $\zeta$ phase precipitate in the non-magnetic matrix of $\epsilon$ phase same as above. In another way of carrying out the invention, when the molten metal is poured into a mold or when it is plunged into a suitable cooling medium after the solidified alloy is subjected to said homogenizing solid solution treatment, if the cooling rate is suitably adjusted, the ferro-magnetic domain fine particles of less than 0.1 micron of $\zeta$ phase can be precipitated in the non-magnetic matrix of $\epsilon$ phase.

Figure 1B:
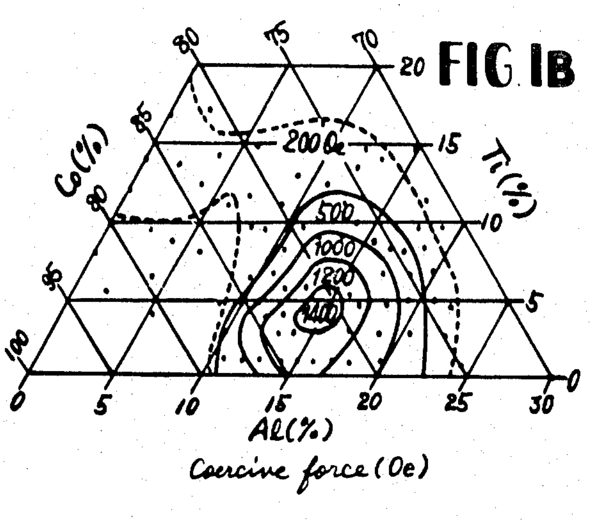
Figure 2A:
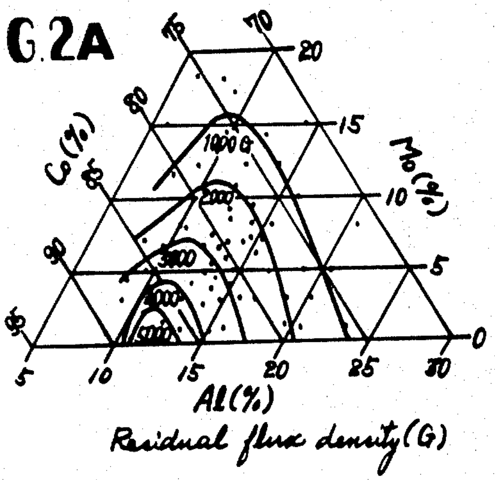
Figure 2B:
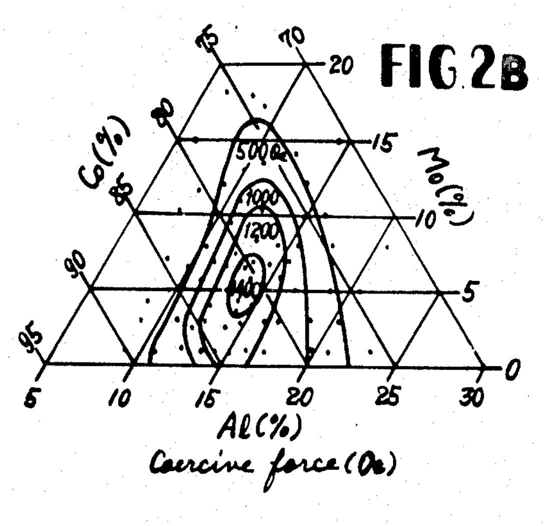
Figure 3A:
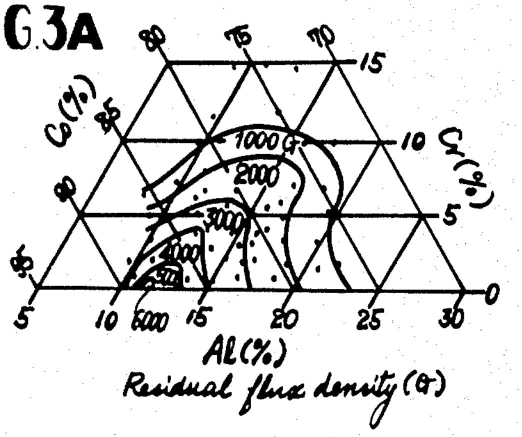
Figure 3B:
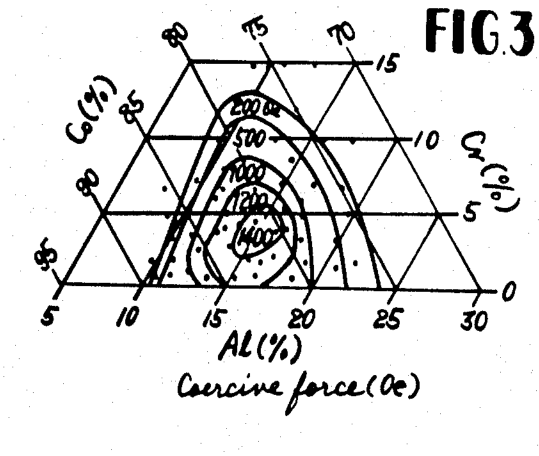
Figure 4A:
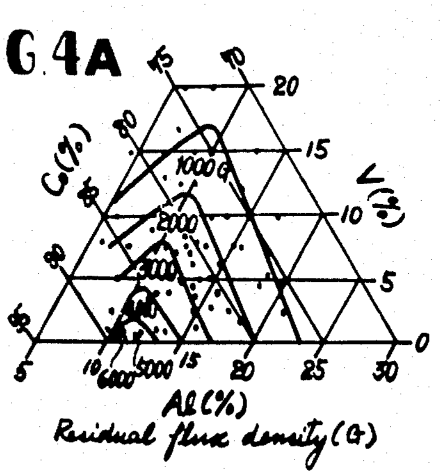
Figure 4B:
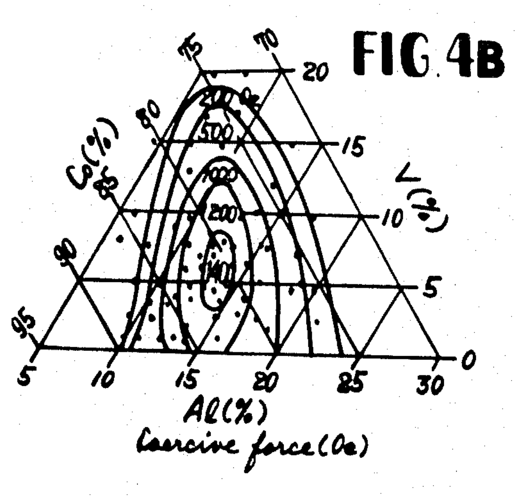
Figure 5A:
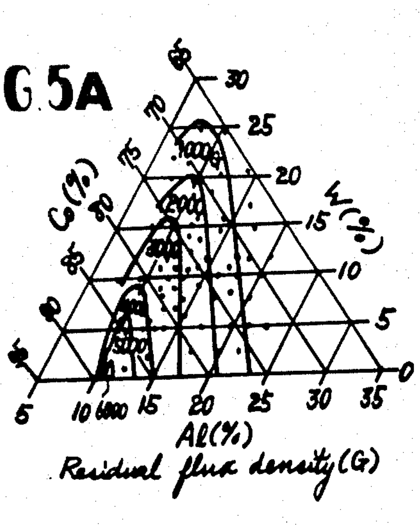
Figure 5B:
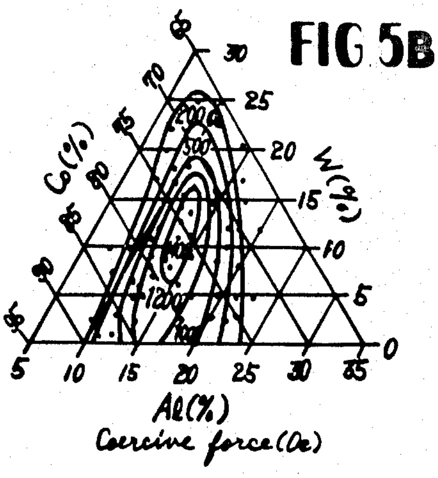
Figure 6A:
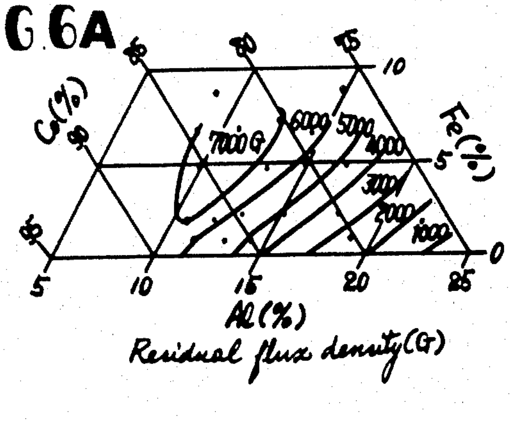
Figure 6B:
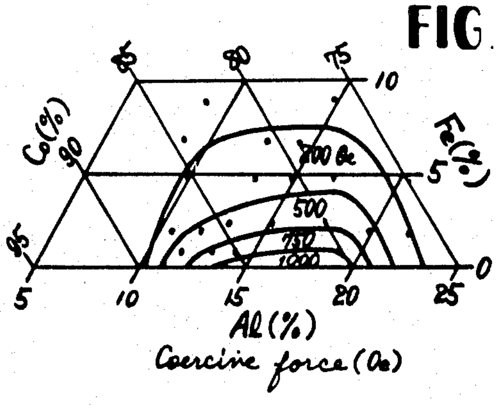
Figure 7A:
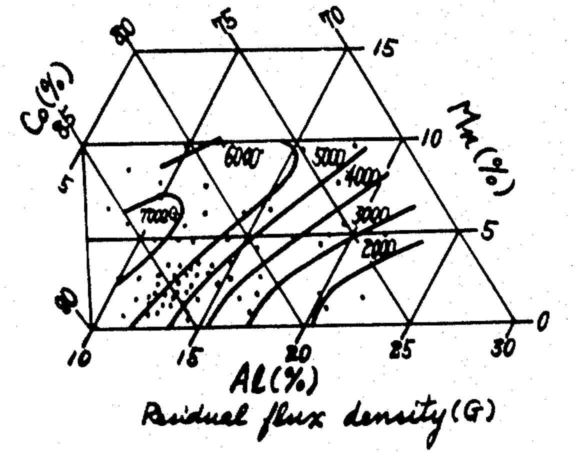
Figure 7B:
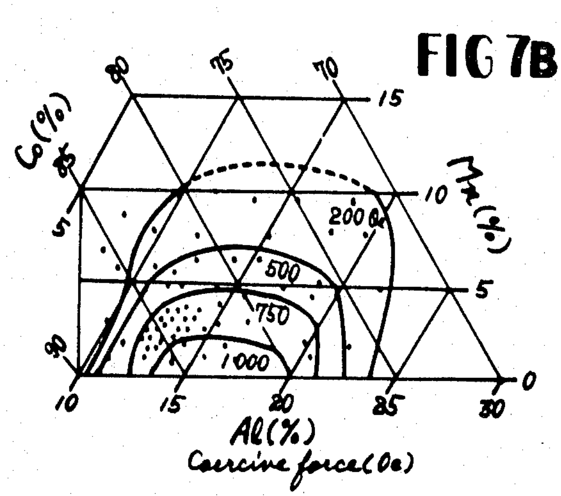
Figure 8A:
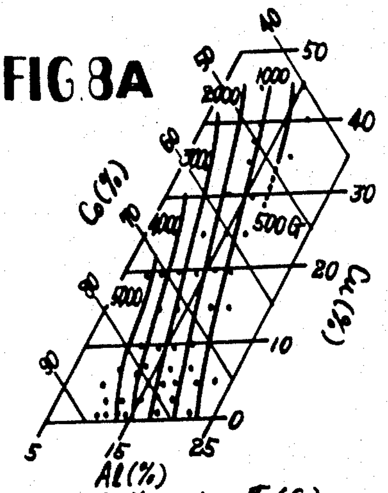
Figure 8B:
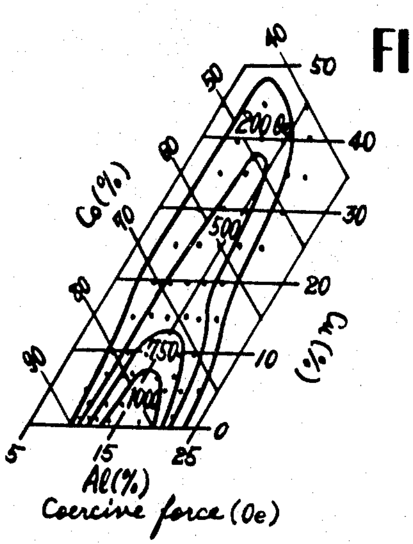
Figure 9A:
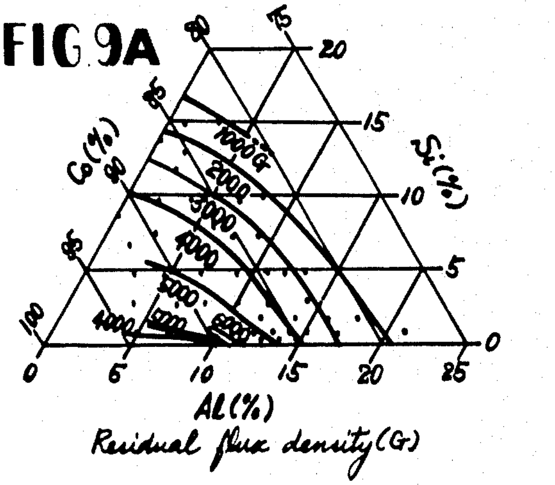
Figure 9B:
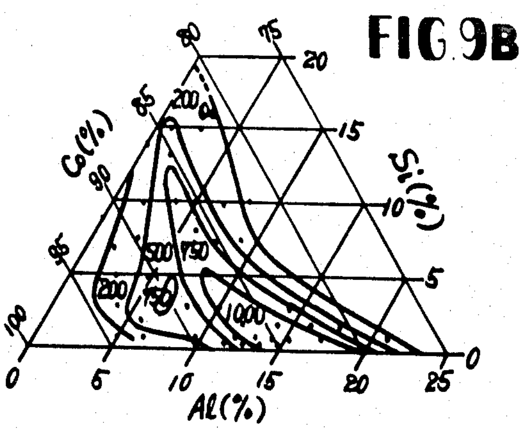
Figure 10A:
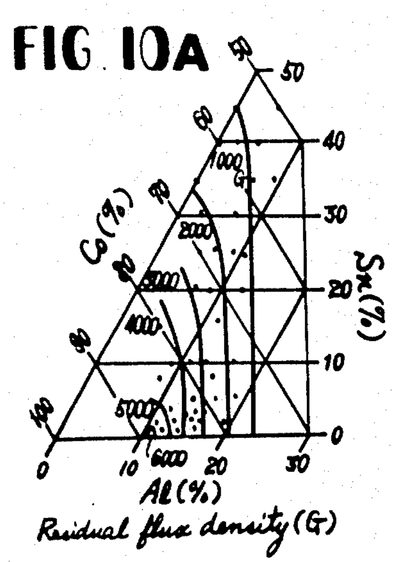
Figure 10B:
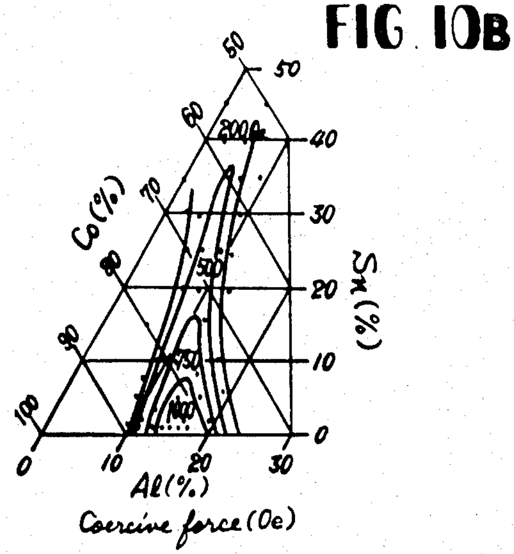
Figure 11A:
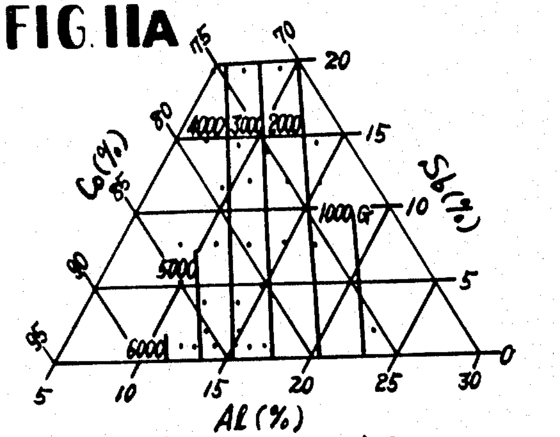
Figure 11B:
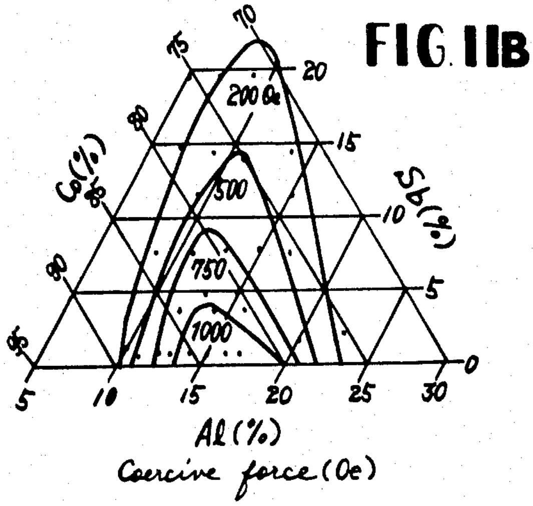

For a better understanding of the invention, reference is made to the accompanying drawings, in which:

FIG. 1-A and -B, FIG. 2-A and -B, FIG. 3-A and -B, FIG. 4-A and -B, FIG. 5-A and -B, FIG. 6-A and -B, FIG. 7-A and -B, FIG. 8-A and -B, FIG. 9-A and -B, FIG. 10-A and -B, and FIG. 11-A and -B illustrate equivalent magnetic property curves statistically obtained from the measured values of magnetic properties (wherein the point [.] shows the composition of the measured alloys);

FIG. 12 is characteristic curves illustrating the relation between magnetic properties and tempering temperature and time of three kinds of alloys made by melt casting; and FIG. 13 shows the equilibrium diagram of Co-Al binary alloys.

When the article thus treated is magnetized in a strong magnetic field, excellent magnetic properties can be developed and a part of such magnetic propermagnetic properties. For instance, when the addition element is Ti, Mo, Cr, V, or W the value of $H_c$ is higher than that of the highest value of the binary alloy of Co-Al and $(BH)_{max}$ usually is reduced by the addition of the third element, yet when Mn is added the highest value increases. At any rate, in the case of ternary alloys, the magnetic properties will become excellent.

TABLE 1

| No. of alloy | Composition (%) Co | Al | Ni | Ti | Mo | Cr | V | Heat-treatment Quenching temp. (°C) | Tempering temp. and time (°C) | (hr) | Br (G) | $H_c$ (Oe) | $(BH)_{max}$ ($\times 10^6$G-Oe) | Forgeability | Density |
|---|---|---|---|---|---|---|---|---|---|---|---|---|---|---|---|
| 1 | 85.1 | 14.9 | — | — | — | — | — | 1,380 | 550 | 6 | 4,200 | 1,320 | 2.34 | Somewhat possible | 7.24 |
| 2 | 65.3 | 14.5 | 22.2 | — | — | — | — | 1,370 | 560 | 7 | 3,300 | 1,600 | 1.62 | possible | 7.15 |
| 3 | 86.1 | 12.9 | — | 1.0 | — | — | — | " | 550 | 5 | 4,800 | 1,140 | 2.04 | " | — |
| 4 | 81.4 | 14.8 | — | 3.8 | — | — | — | " | 575 | 15 | 2,900 | 1,600 | 1.64 | impossible | 7.06 |
| 4' | " | " | — | " | — | — | — | — | 600 | 2 | 3,200 | 1,400 | 1.31 | " | 7.06 |
| 5 | 86.6 | 12.2 | — | — | 1.2 | — | — | 1,380 | 550 | 6 | 5,500 | 980 | 2.05 | possible | — |
| 6 | 80.4 | 13.8 | — | — | 5.8 | — | — | 1,360 | 575 | 15 | 3,000 | 1,650 | 1.50 | somewhat possible | 7.15 |
| 6' | " | " | — | — | " | — | — | — | 600 | 20 | 2,800 | 1,500 | 1.10 | " | 7.15 |
| 7 | 86.8 | 12.2 | — | — | — | 1.0 | — | 1,380 | 550 | 8 | 5,600 | 1,000 | 2.11 | " | — |
| 8 | 80.9 | 15.3 | — | — | — | 3.8 | — | " | " | 10 | 3,100 | 1,550 | 1.40 | impossible | 7.28 |
| 9 | 87.0 | 12.2 | — | — | — | — | 0.8 | " | " | 7 | 5,600 | 960 | 1.95 | possible | — |
| | 81.8 | 13.8 | — | — | — | — | 4.4 | 1,365 | " | 8 | 2,800 | 1,550 | 1.35 | somewhat possible | — |
| Co | Al | W | Fe | Cu | Si | | | | | | | | | | |
| 11 | 86.8 | 12.2 | 1.0 | — | — | — | — | 1,380 | 550 | 5 | 5,400 | 950 | 1.92 | possible | — |
| 12 | 76.0 | 13.3 | 10.7 | — | — | — | — | " | " | 20 | 2,800 | 1,550 | 1.30 | impossible | 7.67 |
| 13 | 86.2 | 12.9 | — | 0.9 | — | — | — | " | " | 10 | 5,300 | 800 | 1.57 | possible | — |
| 14 | 83.3 | 15.8 | — | 0.9 | — | — | — | " | " | " | 4,100 | 1,100 | 1.50 | impossible | 7.00 |
| 15 | 84.1 | 13.2 | — | — | 2.7 | — | — | 1,365 | " | 6 | 6,500 | 900 | 2.60 | possible | — |
| 16 | 82.3 | 15.9 | — | — | 1.8 | — | — | 1,370 | " | 7 | 3,500 | 1,160 | 1.00 | impossible | 7.02 |
| 17 | 80.2 | 14.9 | — | — | — | 4.9 | — | 1,365 | " | 5 | 3,400 | 1,050 | 1.02 | somewhat possible | — |
| 18 | 85.1 | 13.9 | — | — | — | 1.0 | — | 1,370 | " | 6 | 4,400 | 1,050 | 1.70 | possible | 7.31 |
| 19 | 88.0 | 11.5 | — | — | — | — | 0.5 | 1,373 | 575 | " | 5,500 | 950 | 1.95 | " | — |
| 20 | 84.1 | 15.0 | — | — | — | — | 0.9 | 1,370 | " | 7 | 3,600 | 1,200 | 1.48 | somewhat possible | — |
| Co | Al | Sn | Sh | Zn | | | | | | | | | | | |
| 21 | 85.4 | 13.7 | 0.9 | — | — | — | — | 1,370 | 550 | 10 | 5,200 | 980 | 2.00 | impossible | — |
| 22 | 82.5 | 14.8 | 2.7 | — | — | — | — | 1,355 | " | 15 | 3,300 | 1,300 | 1.15 | " | 7.14 |
| 23 | 86.4 | 12.8 | — | 0.8 | — | — | — | 1,360 | 600 | 7 | 5,200 | 1,050 | 2.10 | possible | — |
| 24 | 84.1 | 14.9 | — | 1.0 | — | — | — | " | " | " | 3,800 | 1,200 | 1.50 | " | 7.21 |
| 25 | 86.4 | 12.9 | — | — | 0.7 | — | — | " | 575 | 4 | 5,000 | 980 | 1.90 | " | — |
| 26 | 81.4 | 15.0 | — | — | 3.6 | — | — | " | " | " | 3,700 | 1,250 | 1.65 | " | — |

ties is shown in FIG. 1 to FIG. 12, wherein the curves illustrate magnetic properties measured for ternary alloys, such values being obtained as follows:

At first, metallic cobalt was introduced into an alumina crucible and was melted with a high frequency electric furnace, flushing the metal surface with hydrogen gas, then the melt was poured into an iron mold of 5 mm. inner diameter and a test rod 40 mm. long was obtained. Next, the test piece was heated at a temperature of 1,180° to 1,400° C. for about seven minutes, then quenched in water. Next, the sample was tempered by heating at a temperature of 400° C. to 800° C. for 30 minutes to 300 hours. Various properties of these samples were measured, among which the magnetic properties corresponding to the maximum $H_c$ of each sample are drawn in the curves.

Table 1 illustrates the characteristics of the samples having highest $(BH)_{max}$ and highest $H_c$ of each ternary alloy.

In the Table, the sample marked (') shows an example when molten alloy is poured in an iron mold to chill and then tempered. It shows excellent magnetic properties.

As is apparent from the drawings and the Table, when a binary alloy of Co-Al is alloyed with a third element its properties gradually deteriorate as the addition quantity is increased very much, yet when the addition quantity is comparatively small the added alloy, that is, the ternary alloy will show still excellent Alloy No. marked (') shows the article chill cast in an iron mold, and then tempered.

FIG. 12 represents characteristic curves illustrating the results obtained for a cast alloy which was water quenched and then tempered after homogenizing solid solution treatment.

In the case of FIG. 12 the temperatures and times for tempering were changed to test how the magnetic properties change. As is apparent from these diagrams the coercive force of the sample cast in an iron mold and that after quenching in water showed very small coercive force since ferro-magnetic fine particles of $\zeta$ phase have not substantially precipitated. On the other hand, if the alloy in the sample was heated to a temperature above 200°C. and below the solid solubility line for 1 hour to 20 hours, the coercive force increased gradually and reached the highest value and then gradually decreased, and the residual magnetic flux density and $(BH)_{max}$ also followed generally similar results by heating and it will be apparent that in order to obtain the highest value of magnetic properties there would exist an optimum heating temperature and time. Thus, it will be understood that according to the invention, very large coercive force can be obtained by a simple method of alloying and heat treatment. FIG. 12 shows that in cases of casting in an iron mold and quenching in water since the cooling rate is very high, there occurs no precipitation of fine particles of less than 0.1 micron of ζ phase, so that the magnetic properties are very low, yet by selecting a slow cooling speed corresponding to its composition excellent magnetic properties may be obtained without further tempering.

As is apparent from the Table 1, in the case of the alloys of the invention similarly to those of binary alloys of Co-Al, when the quantity of Al is small the alloy is forgeable, and as the quantity of Al increases the forging becomes gradually more difficult. In the case of the alloys of the invention, as they contain aluminum the specific gravity is rather low.

The relation between the magnetic properties and the composition of the permanent magnets manufactured by the method of the invention is shown in Table 2 which shows that as the concentration range of alloys becomes narrow the characteristics are more improved.

TABLE 2

| (1) | Co(%) | Al(%) | Ti(%) | Br(G) | $H_c$ (Oe) |
|---|---|---|---|---|---|
| | 70 -95 | 0 -25 | 0–20 | 1,000–6,500 | 200–1,600 |
| | 73.5–89.5 | 9.5–23 | 0–13 | 1,000–5,400 | 500–1,600 |
| | 76 -87.5 | 10 -20 | 0–10 | 1,000–5,300 | 1,000–1,600 |
| | 78.5–84 | 13 -17 | 0– 7 | 2,000–3,800 | 1,300–1,600 |
| (2) | Co(%) | Al(%) | Mo(%) | | |
| | 70 -92 | 5 -25 | 0–20 | 500–6,000 | 200–1,650 |
| | 73.5–89.5 | 8 -22.5 | 0–17 | 500–6,000 | 500–1,650 |
| | 75.5–87 | 10.5–20 | 0–12.5 | 1,000–5,500 | 1,000–1,650 |
| | 78 -84 | 12.5–16 | 0–9 | 2,000–3,500 | 1,300–1,650 |
| (3) | Co(%) | Al(%) | Cr(%) | Br(G) | $H_c$(Oe) |
| | 74 -90 | 8 -24 | 0–13 | 1,000–6,000 | 200–1,550 |
| | 76.5–89.5 | 9.5–22 | 0–12 | 1,000–6,000 | 500–1,550 |
| | 77.5–87.5 | 11 -20 | 0– 9 | 1,500–5,700 | 1,000–1,550 |
| | 79 -84.5 | 13 -17.5 | 0– 6 | 2,000–4,300 | 1,300–1,550 |
| (4) | Co(%) | Al (%) | V(%) | | |
| | 72.5–90 | 5 -24 | 0–19 | 500–6,000 | 200–1,550 |
| | 74 -89.5 | 6.5–22.5 | 0–17.5 | 700–6,000 | 500–1,550 |
| | 76 -87 | 8 -20 | 0–14 | 1,000–4,500 | 1,000–1,550 |
| | 78 -84 | 11 -16 | 0–10.5 | 2,000–3,700 | 1,300–1,550 |
| (5) | Co(%) | Al(%) | W(%) | | |
| | 66 -90 | 6 -24 | 0–26 | 400–6,000 | 200–1,550 |
| | 67.5–89.5 | 8 -22.5 | 0–22.5 | 400–6,000 | 500–1,550 |
| | 69.5–87 | 10 -20 | 0–18.5 | 500–5,500 | 1,000–1,550 |
| | 72 -84 | 11.5–16 | 0–17 | 1,200–4,000 | 1,300–1,550 |
| (6) | Co(%) | Al(%) | Fe(%) | | |
| | 76 -89.5 | 9.5–23.5 | 0– 7.5 | 1,000–8,200 | 200–1,100 |
| | 77.5–89 | 11 -22 | 0– 4 | 1,500–7,000 | 500–1,100 |
| | 80 -86.5 | 13.5–20 | 0– 1 | 2,000–5,000 | 1,000–1,100 |
| (7) | Co(%) | Al(%) | Mn(%) | | |
| | 71 -90 | 9 -24 | 0–12 | 1,000–7,500 | 200–1,150 |
| | 75 -89 | 11 -23 | 0– 7 | 1,200–7,000 | 500–1,150 |
| | 79.5–86.5 | 13 -20 | 0– 7 | 2,000–5,000 | 1,000–1,150 |
| (8) | Co(%) | Al(%) | Cu(%) | | |
| | 42 -90 | 7 -23.5 | 0–50 | 500–6,000 | 200–1,050 |
| | 49 -89 | 10.5–22.5 | 0–37.5 | 500–6,000 | 500–1,050 |
| | 76 -86.5 | 13.5–20 | 0– 8 | 1,600–5,000 | 1,000–1,050 |
| (9) | Co(%) | Al(%) | Si(%) | Br(G) | $H_c$(Oe) |
| | 76 -94.5 | 0 -23.5 | 0–19 | 500–6,000 | 200–1,250 |
| | 78 -93 | 0.5–22 | 0–15.5 | 1,000–6,000 | 500–1,250 |
| | 80 -88 | 7.5–20 | 0–6 | 2,000–5,600 | 1,000–1,250 |
| (10) | Co(%) | Al(%) | Sn(%) | | |
| | 52 -89.5 | 0 -24 | 0–45 | 500–6,200 | 200–1,300 |
| | 58 -89 | 4.5–22.4 | 0–37 | 500–6,200 | 500–1,300 |
| | 78 -86 | 12.5–20 | 0– 8 | 1,500–5,200 | 1,000–1,300 |
| (11) | Co(%) | Al(%) | Sb(%) | | |
| | 70 -90 | 7 -23.5 | 0–22 | 500–5,800 | 200–1,250 |
| | 75 -89 | 9.5–22 | 0–14.5 | 1,000–5,800 | 500–1,250 |
| | 80 -86.5 | 12.5–20 | 0– 4.5 | 2,200–5,200 | 1,000–1,250 |

The reason why the concentration of each element in the alloys is limited to a definite range respectively is due to the fact that as is apparent from the curves the residual magnetic flux densities and coercive forces of the alloys in the specified range show high values, but those outside of the specified range have worse characteristics.

FIG. 13 illustrates equilibrium diagram of Co-Al binary alloys containing 75 to 89% of Co and 11 to 25% of Al when quenched from a temperature above the *a-b* solubility line show generally a single phase ε, but if it is heated at a temperature below the *a-b* solid solubility line for several minutes to several hundred hours the fine grain particles of less than 0.1 micron of ζ phase having a magnetic transformation point at about 840°C. is precipitated.

In short, in the method of manufacturing permanent magnets according to the invention the alloy containing 42 to 95% of Co and 1 to 25% of Al alloyed with 1 to 57% total of 0 to 20% of Ti, 0 to 20% of Mo, 0 to 13% of Cr, 0 to 19% of V, and 0 to 26% of W, containing a small quantity of impurities is melted and thrown in a suitable medium or chill cast in a metal mold or the cast or forged article is quenched by a suitable method from a high temperature above the solid solubility line and tempered. The tempering is effected in either of the cases at a comparatively low temperature above 200° C. and lower than the solid solubility line for several minutes to several hundred hours. And according to a third manufacturing method of the invention, when the melt is cast in a metal mold or sand mold, or when it is cooled from a high temperature above the solid solubility line, its cooling rate is adjusted to slowly cool, thereby precipitating ferro-magnetic fine particles of less than 0.1 micron of ζ phase in the nonmagnetic matrix of ε phase, whereby a large coercive force can be developed.

According to the invention, the residual magnetic flux density is usually greater than that of ferrite magnets and accordingly the method of the invention is specially adapted for the manufacture of magnets of short dimension ratio and by selecting the composition suitably it can be forged and has low specific gravity, so that there are many useful industrial applications.

Having described our invention, we claim:

1. A method of manufacturing high coercive force permanent magnets, comprising heating an alloy consisting essentially of about 66 to 95% by weight of cobalt, 5 to 25% by weight of aluminum, and a member selected from the group consisting of about 3.8% Ti, about 5.8% Mo, about 3.8% Cr, about 4.4% V and about 10.7% W, to a temperature above the ε + ζ binary region, quenching the alloy from a temperature above the solid solubility line to a temperature below the upper boundary of the ε + ζ binary region at a rate to produce a substantially single-phase solid solution of ε, heating the alloy in said binary region at a temperature above 200°C. for several minutes to several hundred hours to precipitate fine particles of ferro-magnetic ζ in a matrix of non-magnetic ε, and magnetizing the product thus obtained in a strong magnetic field to obtain a permanent magnet having a high coercive force, said member being effective to increase the coercive force substantially above the coercive force of the same cobalt-aluminum alloy without said member.

* * * * *